(No Model.) 2 Sheets—Sheet 1.
F. A. WILKINSON.
HEATING STOVE OR FURNACE.
No. 599,377. Patented Feb. 22, 1898.
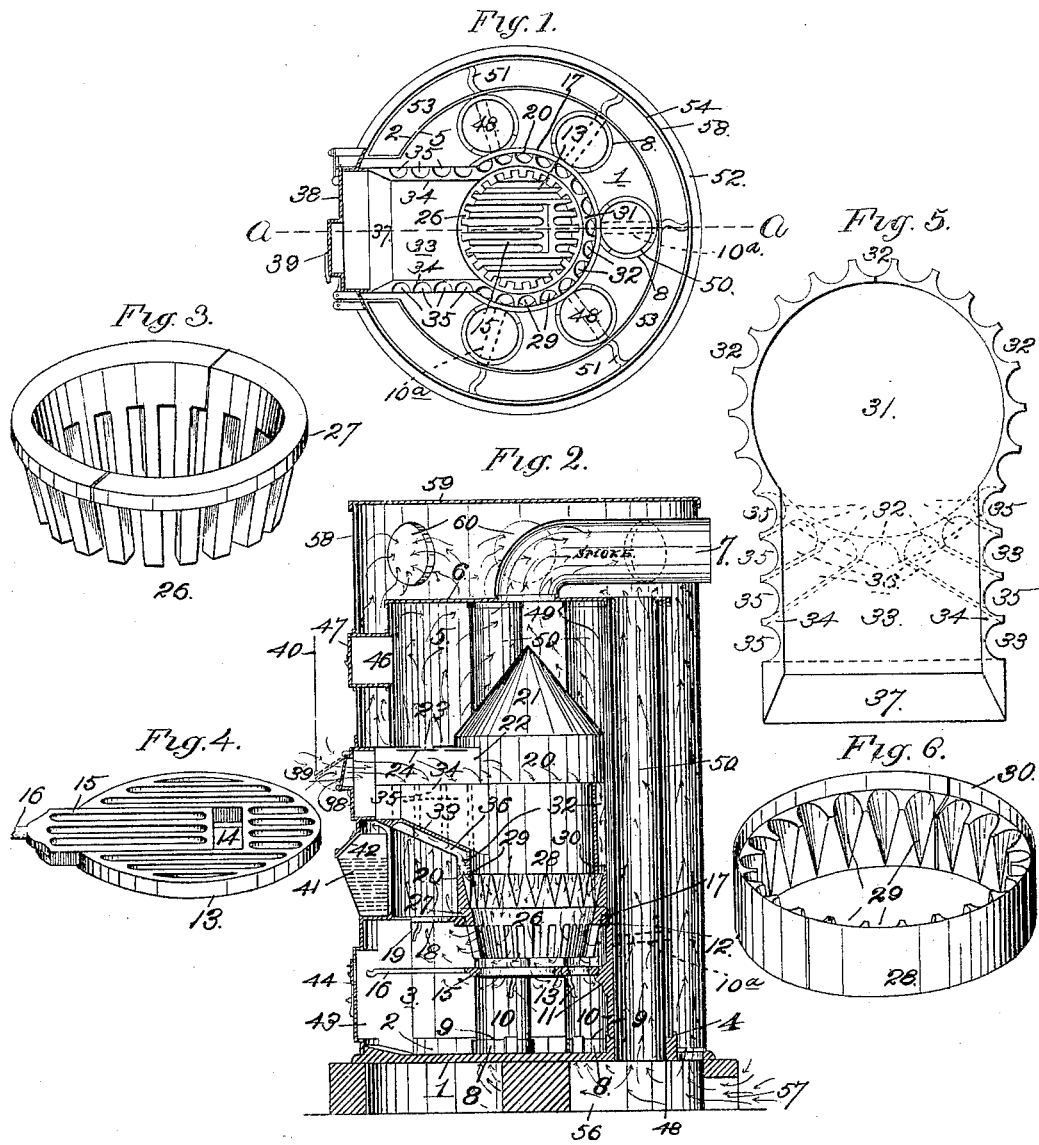
WITNESSES:
INVENTOR
F. A. Wilkinson
BY
ATTORNEYS.

(No Model.) 2 Sheets—Sheet 2.
F. A. WILKINSON.
HEATING STOVE OR FURNACE.
No. 599,377. Patented Feb. 22, 1898.
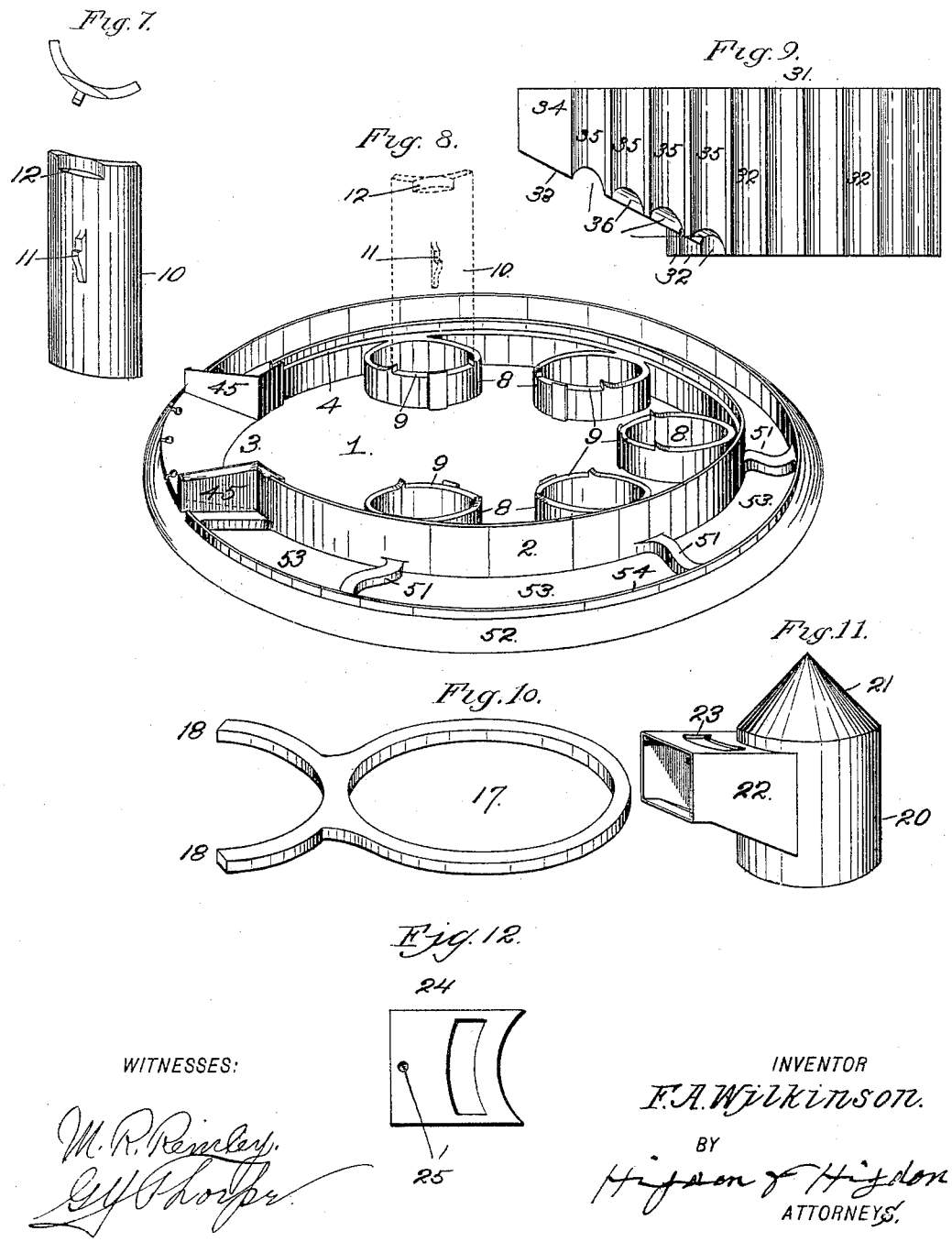
WITNESSES:
INVENTOR
F. A. Wilkinson.
BY
Higdon & Higdon
ATTORNEYS.

UNITED STATES PATENT OFFICE.

FRANCIS A. WILKINSON, OF OTTAWA, KANSAS.

HEATING STOVE OR FURNACE.

SPECIFICATION forming part of Letters Patent No. 599,377, dated February 22, 1898.

Application filed November 9, 1896. Serial No. 611,453. (No model.)

*To all whom it may concern:*

Be it known that I, FRANCIS A. WILKINSON, of Ottawa, county of Franklin, State of Kansas, have made certain new and useful Improvements in Heating Stoves or Furnaces, of which the following is a full, clear, and exact description, reference being had to the accompanying drawings, forming a part thereof.

My invention relates to heating apparatus, and more especially to an improvement in heating stoves or furnaces.

The object of the invention is to secure a complete downdraft, and consequently a more perfect combustion with greater economy of fuel than has hitherto been obtained, so far as my knowledge extends.

A further object of the invention is to secure the maximum amount of heating and radiating surface within the minimum amount of space.

To these ends, which will hereinafter appear, the invention consists in certain novel and peculiar features of construction and combinations of parts, as will be hereinafter described and claimed.

Referring to the said drawings, illustrative of the invention, Figure 1 represents a horizontal section taken at the top of the fuel-door. Fig. 2 represents a vertical central section taken on the line A A of Fig. 1. Fig. 3 represents a detail perspective view of the lower part of the fire-pot. Fig. 4 represents a detail perspective view of the grate. Fig. 5 is a plan view of the lining of the fuel magazine or reservoir. Fig. 6 is a detail perspective view of the upper portion of the fire-pot. Fig. 7 is a top plan view and a detail perspective view, enlarged, of one of the standards which support the grate, the fire-pot, and the fuel-magazine. Fig. 8 is a detail perspective view, on the same enlarged scale as Fig. 7, of the base of the stove or furnace. Fig. 9 is a side elevation of the fuel-magazine lining on the same scale as Fig. 5. Fig. 10 is a detail perspective view on the same scale of the fire-pot and fuel-magazine supporting-ring. Fig. 11 is a detail perspective view of the fuel-magazine on the scale of Fig. 2. Fig. 12 is an inverted plan view of the draft-controlling slide carried by the feed-chute of said magazine.

Similar reference-numerals designate like parts in all of the figures, in which—

1 designates a base, preferably of cast metal and circular in form, and 2 a flange which projects marginally upward from the same and is formed with an opening 3 for a purpose which will hereinafter appear. Said flange is grooved at its inner upper edge, as at 4, upon which rests the cylindrical wall or shell 5 of the stove. The upper end of said shell is closed by a top plate 6, and communicating with a central opening in the same is a flue 7, which conveys the smoke and other products of combustion to the chimney. (Not shown.)

8 designates a series of flanges, preferably circular in form, which project upwardly from the base, and they are provided with sockets 9 at their upper ends, the said circular flanges being arranged in a series concentric with reference to the center of the base and are preferably cast integral with the same and the marginal flange 2.

10 designates a set of vertical segmental standards, which fit at their lower ends in the sockets 9 and are formed at their outer sides with lugs 11, arranged vertically and a slight distance below the shoulders 12, formed, preferably, by notching the upper ends of said plates. A circular grate 13, of the construction shown, preferably is mounted upon the lugs 11. The grate 13 is provided with a slot 14, and normally closing the same and dovetailed therein is a member 15 of the grate, which is provided with a handle 16, projecting forwardly through an opening in the shell of the stove, registering with the opening 3 of the flange of the base, in order that said member 15 of the grate may be pulled forward to permit the contents of the fire-pot to drop down in the ash-pit formed by the base 1 and the shell of the stove.

17 designates a ring which is arranged horizontally and rests upon the shoulder 12 of the standard 10, and said ring is provided with a pair of forwardly and outwardly projecting arms 18, which are preferably secured to lugs 19, projecting inwardly of the stove-frame. Thus it will be seen that said ring is supported principally by said standards and the stove-frame and at the same time serves to prevent them from moving inwardly and straining the sockets 9 or crowding the grate 13, so as to make it difficult of operation. Said standards are prevented from moving outwardly by means to be hereinafter described.

20 designates a cylindrical fuel-magazine open at its lower end and provided with a conical top 21 in order that the products of combustion may not accumulate upon the same, but will by their own gravity slide downward and be precipitated into the ash-pit below. At its front side said fuel-magazine is provided with an opening which communicates with fuel feed-chute 22, the bottom of which slopes downwardly in order that the feeding operation may take place automatically. Said magazine is of about the same diameter as and is supported upon the ring 17, as shown clearly in Fig. 2. The upper wall of the feed-chute is provided with an elongated opening 23, controlled by a slotted slide-plate 24, arranged against the under side of said top wall, and said slide-plate is provided with a recess 25, for engagement by a poker or equivalent device, whereby it may be moved outward to cause the slots to register or may be moved inward to close the slot of the chute. The object of this construction will be hereinafter explained.

26 designates the skeleton member of the fire-pot, and said member at its upper margin is provided with an outwardly-projecting flange 27 of such diameter that when the member is fitted pendently through the ring 17 said flange will rest securely upon the latter, as shown clearly in Fig. 2. The diameter of said member is such that the flange fits snugly within the lower end of the fuel-magazine, and in order to facilitate the operation of placing said fire-pot in or removing it from position it is preferably cast in halves, so that it may be fitted in place after the fuel-magazine is properly positioned by introducing said halves successively through the feed-chute.

28 designates the upper member of the fire-pot, and this member, like the member 26, is of annular form and of equal diameter, so as to fit sungly within the fuel-magazine. Said member internally is formed with a number of vertical grooves or passages 29, said grooves or passages tapering to a point at their lower ends both laterally and inwardly, so that the point of said grooves shall be flush with or in the plane of the inner face of said member. The member continues upwardly a slight distance beyond the upper ends of said grooves, so as to form, preferably, a thin marginal flange 30, which embraces the lower end of the circular lining 31 of the fuel-magazine, said lining being provided externally with vertical grooves or passages 32, which register with the vertical tapering grooves or passages 29 of the upper member of the fire-pot, as also shown in Fig. 2. The said lining is provided at its front side with a communicating extension 33, which projects into the feed-chute and is formed with a correspondingly-inclined bottom to insure and facilitate the gravitative movement of the fuel. Said extension is provided with side walls 34, which project upwardly to the plane of the upper end of the circular portion of the lining, as shown, and said walls are provided externally with vertical grooves 35. The under side of the extension 33 is also provided with passages 36, which connect the said grooves 35 with the short vertical grooves 32 at the front side of the circular or body portion of the lining, as shown clearly in dotted lines, Fig. 5, and full lines, Figs. 2 and 9. The bottom of said lining extension is formed, preferably, with a lip 37 about in the plane of the cast-metal door-frame 38, (see Figs. 1 and 2,) which closes the front end of the feed-chute. The fuel-door, which is adapted to be opened when supplying the magazine with fuel, is provided with an opening normally covered by a hinge-plate 39, which is opened more or less, accordingly as the volume of draft is to be increased or diminished. This door may be opened or closed when used as a furnace in the basement of a building by means of a chain or flexible connection 40, which may extend upwardly into the room above, so as to obviate the necessity of going down to the basement to regulate the furnace, or it may be provided with an ordinary apertured slide-plate and preferably will be when used simply as a stove. This apertured slide-plate being used for controlling the draft in nearly all stoves in use is not shown in this connection, as it is common property.

Below the door 38 the stove or furnace is cast with a chamber 41 for the reception of water, and said chamber is provided with an ordinary hinged door 42. Below said chamber or water-reservoir is a frame 43, which carries the ash-pit door 44, and said door-carrying frame communicates with and closes the registering openings of the flange 2 and the shell of the stove. The ash-pit door in length preferably corresponds to the length of the opening 3, which is large enough for the insertion of a shovel to remove the ashes when desirable or necessary. In order to facilitate the securing of said door-frame 43 in position, the flange 2 is preferably provided at opposite sides of its opening with the sockets 45. This is merely a detail of construction and need not be enlarged on.

Above the feed-chute of the magazine the shell is preferably provided with an opening 46, which performs the function of an observation-opening in order that the workings of the furnace may be observed and to render access to the interior of the stove or furnace more convenient and easy. Said opening is normally closed by a door 47.

The stove as thus constructed may be mounted upon feet in the customary manner or upon any other suitable support which will raise it a sufficient distance from the floor, because the bottom of the stove becomes exceedingly hot.

As above described, the stove provides alone for direct radiation of heat. If circulation of air within the room is also desired, the base of the stove within said circular flanges 8 will be perforated, as at 48, and in vertical alinement with said openings. The top plate 6 will also be provided with openings of the same size and will preferably be surrounded by depending flanges 49 to receive and tightly embrace the upper ends of the vertical air-tubes 50, secured at their lower ends in flanges 8, surrounding the perforations or openings 48 and fitting against the outer or concaved sides of the standards 10, and thereby preventing said standards from outward movement. Where such flues or pipes are not used, however, said standards at their upper ends will be braced from outward movement by means of the strips $10^a$, which are secured to and bear at their opposite ends against said standards and the shell or body of the stove. Said strips are indicated by dotted lines in Figs. 1 and 2. By this arrangement it is obvious that when the stove is in operation it will not only radiate heat from the shell, but will also, by heating the air within said tubes, establish a continuous circulation of air throughout the room. The stove, it will be seen, thus combines the desirable features of direct radiation of a stove and of circulation like a heating-drum, being more effective than the former because of such combined action and more effective than the latter because a person coming in very cold may be quickly warmed by the direct radiation of heat, which, as well-known, is impossible with a heating-drum, as it radiates practically no heat.

When this structure is to be employed as a furnace, the base 1 is connected by a series of outwardly-extending arms 51 with a ring 52, so as to form a series of large air-passages 53 around the flange 2, and said ring at its inner margin is provided with an upwardly-projecting flange 54. Between the socket-plates 45 no opening 53 is formed, for obvious reasons. In this connection the base-plate is preferably mounted upon a brick or stone foundation 55, having an annular opening 56, which communicates with the lower ends of the air-tubes 50 and with the air-passages 53, and also with an air-supply opening 57 in one wall of such brick or stone foundation. The whole stove structure is also surrounded by a casing 58, which externally embraces the flange 54 and rests upon the ring 52, and said casing is provided with a top plate 59, closing its upper end, and with a series of air-outlet openings 60. Through one of said openings 60 the smoke-pipe 7 will preferably extend.

It is obvious from the construction described that the entire draft must pass through the fuel-magazine, downward through the grate, and upwardly externally of said magazine before it can escape, and that owing to the peculiar construction and arrangement of said magazine and the relation between its lining and the fire-pot it is impossible for the fuel to burn in any other way except downward, the fire burning all the time against the draft and thereby causing very slow combustion. Consequently the fuel obviously gives forth the maximum amount of heat for the quantity of fuel consumed. All the flames, heat, and products of combustion are forced first toward the base of the stove or heater, and consequently more heat is radiated near the floor or base than at any other point, and the temperature of the room, as a result, more quickly rises.

It is also obvious, owing to the fact of the peculiar construction and relation between the upper portion of the fire-pot and the lining of the fuel-magazine, that the draft has access to the fire in equal volume at all sides and can pass freely into the body of the burning fuel by reason of the tapering grooves 29. Consequently the flames, heat, and products of combustion are driven downwardly and turned outwardly equally in all directions, so as to impinge directly against the hot-air flues and the shell of the stove near its lower end. It then passes upward, completely enveloping the said pipes, and passes off through the smoke-pipe 7. Therefore it will be seen that every part of the stove or furnace from the base to the top is thoroughly heated, and with said hot-air flues or pipes radiates and circulates heat in every direction.

Another very important feature to which attention should be called is that when the fuel-door is open no smoke or gas can possibly escape into the room, for then the draft is strongest and carries all the flames, heat, and products of combustion downward away from the door-opening.

Another advantage lies in the fact that when putting on fresh fuel the stove is not cooled off, and it is also obvious, owing to the capacity of said magazine and the inclined formation of its feed-chute, that a large quantity of fuel may be placed in said magazine and will be automatically fed by gravitative action down into the fire-pot.

A still further advantage the use of this stove or furnace has is its self-cleaning feature—that is to say, owing to the fact that all the flues or pipes are vertical and the top of the fuel-magazine conical, about all the soot and other like products of combustion coming in contact with such parts will be precipitated into the ash-pit below. The smoke-pipe, of course, will occasionally need cleaning.

When the ashes are to be removed, it is obvious that a great volume of air will rush into the stove, and some of it will pass up through the fire into the fuel-magazine. To prevent this smoke and gas from escaping into the room through the fuel-door, which possibly may not fit closely after being used some time, I have provided the feed-chute with the opening 23 and the sliding slotted plate 24. Before the ash-pit door is opened I open the fuel-door, insert a poker or other device into the cavity 25 and pull said slide outwardly until its opening or slot registers with the opening or slot of the feed-chute, and then close the fuel-door. The ash-pit door may now be opened with perfect safety, as any smoke and gas which may be driven up into the magazine will escape through the registering openings of the feed-chute and pass off through the smoke-pipe.

In practice I prefer to construct this stove or furnace almost exclusively of sheet-steel for hygienic reasons.

Having thus described the invention, what I claim as new, and desire to secure by Letters Patent, is—

1. In a heating stove or furnace, a shell or body portion, a smoke-pipe communicating with its upper end, a fuel-door in its side, through which air enters for draft purposes, a grate, a fire-pot provided internally at its upper end with downwardly-tapering air-passages, a fuel-magazine, having its open lower end communicating with the upper end of the fire-pot, and having a feed-chute communicating with the fuel-door, and a lining for said fuel-magazine and feed-chute, provided externally with air-passages which open at their upper ends into the magazine and feed-chute, and register at their lower ends with air-passages for the fire-pot, in order that air may be delivered into the body of the fire, substantially as described.

2. In a heating stove or furnace, a shell or body portion, a smoke-pipe communicating with its upper end, a fuel-door through which air enters for draft purposes, standards supported from the bottom of the shell or body portion, a grate rotatably mounted thereon, a ring also mounted thereon, a fire-pot depending through and supported by said ring, and a fuel-magazine resting upon said ring and embracing and communicating with the upper end of the fire-pot, and provided with a feed-chute communicating with the fuel-door, substantially as shown and described.

3. In a heating stove or furnace, a shell or body portion, a smoke-pipe communicating with the upper end of the same, a fuel-door in its side through which air enters for draft purposes, a grate, a fire-pot above the same, and comprising a lower skeleton member, and an upper member having internal grooves or air-passages, and a fuel-magazine above and communicating with the upper member of the fire-pot, and provided with a feed-chute communicating with the fuel-door, substantially as described.

4. In a heating stove or furnace, a shell or body portion, a smoke-pipe communicating with its upper end, a fuel-door in its side through which air enters for draft purposes, standards erected from the base of the shell, a grate carried thereby, a ring horizontally supported by said standards, a fire-pot consisting of a lower skeleton member depending through said ring and having a flange which rests upon it, and an upper internally-grooved member resting upon the skeleton member, and a fuel-magazine above and communicating with the upper end of said upper member, and provided with a feed-chute, communicating with the fuel-door, substantially as described.

5. In a heating stove or furnace, a shell or body portion, provided with socketed flanges, a smoke-pipe communicating with its upper end, a fuel-door in its side through which air enters for draft purposes, standards resting upon said socketed flanges, a grate supported by said standards, a ring supported by said standards, a fire-pot supported by said ring, and a fuel-magazine externally embracing the fire-pot and resting upon said ring, and provided with a feed-chute communicating with the fuel-door, substantially as described.

6. In a heating stove or furnace, a shell or body portion, having socketed flanges on its base, a smoke-pipe communicating with its upper end, a fuel-door in its side through which air enters for draft purposes, vertical standards fitting in said socketed flanges and braced from outward movement, a ring supported by and bracing said standards from inward movement, a fire-pot carried by and depending through said ring, a grate below said fire-pot, and a fuel-magazine upon said ring and surrounding and communicating with the upper end of the fire-pot, and provided with a feed-chute, communicating with the fuel-door, substantially as described.

7. In a heating stove or furnace, a shell or body portion, having an apertured base and socketed flanges surrounding said apertures, and an apertured top, vertical air-pipes connecting the apertures of the base and of the top, a smoke-pipe communicating with the upper end of the shell, a fuel-door in its side through which air enters for draft purposes, segmental standards fitting in said socketed flanges and embracing said pipes, a grate supported by said standards, a ring supported by said standards, a fire-pot supported by and depending through said ring, and a fuel-magazine resting upon said ring and surrounding and communicating with said fire-pot, and provided with a feed-chute, communicating with said fuel-door, substantially as described.

8. In a heating stove or furnace, a shell or body portion, a smoke-pipe communicating with its upper end, a fuel-door in its side through which air enters for draft purposes, an observation-door-controlled opening above the fuel-door, a grate, a fire-pot above the same, a fuel-magazine resting upon and communicating with the upper end of the grate and provided with a feed-chute communicating with the fuel-door, substantially as described.

9. In a heating stove, or furnace, a shell or body portion, consisting of a cylinder, a top plate, and a base having air-passages surrounding the cylinder, a door in its side, through which air enters for draft purposes, a grate, a fire-pot above said grate, a fuel-magazine above and communicating with the fire-pot, and provided with a feed-chute communicating with the fuel-door, a casing resting upon the base and surrounding the shell or body portion and said surrounding passages, and provided at its upper end with openings, and with openings through which the fuel and ash-pit door frames project, a smoke-pipe communicating with the upper end of the shell or body portion and extending through one of the openings in the upper end of the casing, and a foundation upon which the base rests, provided with passages for supplying air to the interior of the casing, substantially as described.

In testimony whereof I affix my signature in presence of two witnesses.

FRANCIS A. WILKINSON.

Witnesses:
G. Y. THORPE,
M. R. REMLEY.